(12) United States Patent
Egawa et al.

(10) Patent No.: US 11,322,790 B2
(45) Date of Patent: May 3, 2022

(54) PRISMATIC SECONDARY BATTERY

(71) Applicant: VEHICLE ENERGY JAPAN INC., Hitachinaka (JP)

(72) Inventors: Hiroaki Egawa, Ibaraki (JP); Yutaka Satou, Ibaraki (JP)

(73) Assignee: VEHICLE ENERGY JAPAN INC., Hitachinaka (JP)

( * ) Notice: Subject to any disclaimer, the term of this patent is extended or adjusted under 35 U.S.C. 154(b) by 101 days.

(21) Appl. No.: 16/324,329

(22) PCT Filed: Jul. 20, 2017

(86) PCT No.: PCT/JP2017/026234
§ 371 (c)(1),
(2) Date: Feb. 8, 2019

(87) PCT Pub. No.: WO2018/042928
PCT Pub. Date: Mar. 8, 2018

(65) Prior Publication Data
US 2019/0173062 A1 Jun. 6, 2019

(30) Foreign Application Priority Data
Sep. 5, 2016 (JP) .............................. JP2016-172682

(51) Int. Cl.
*H01M 50/147* (2021.01)
*H01M 50/172* (2021.01)
(Continued)

(52) U.S. Cl.
CPC ....... *H01M 50/147* (2021.01); *H01M 50/172* (2021.01); *H01M 50/183* (2021.01);
(Continued)

(58) Field of Classification Search
CPC ............ H01M 2/04; H01M 2/06; H01M 2/26; H01M 50/147; H01M 50/172;
(Continued)

(56) References Cited

U.S. PATENT DOCUMENTS

2005/0287430 A1 12/2005 Kim et al.
2009/0297940 A1 12/2009 Nansaka et al.
(Continued)

FOREIGN PATENT DOCUMENTS

CN 103165847 A 6/2013
CN 104103796 A 10/2014
(Continued)

OTHER PUBLICATIONS

International Search Report with English translation and Written Opinion issued in corresponding application No. PCT/JP2017/026234 dated Oct. 31, 2017.
(Continued)

*Primary Examiner* — Milton I Cano
*Assistant Examiner* — Jenna Shulman
(74) *Attorney, Agent, or Firm* — Foley & Lardner LLP

(57) ABSTRACT

A prismatic secondary battery including a battery container containing an electric storage element and having first and second wide surfaces and an opening; a lid having first and second through holes and a centerline extending along a length of the lid; a first and second flat plate-like current collector plate inserted into the first and second through holes made of metal materials. A first insertion position of the first current collector plate is spaced at a first distance from the centerline of the lid, the first distance extending in a direction parallel to a top surface of the lid from the centerline toward the first wide surface. A second insertion position of the second current collector plate is spaced at a
(Continued)

second distance from the centerline, the second distance extending in a direction parallel to the top surface of the lid.

17 Claims, 6 Drawing Sheets

(51) Int. Cl.
    *H01M 50/183*     (2021.01)
    *H01M 50/531*     (2021.01)
    *H01M 50/538*     (2021.01)
    *H01M 50/60*     (2021.01)
    *H01M 10/0525*     (2010.01)

(52) U.S. Cl.
    CPC ....... *H01M 50/531* (2021.01); *H01M 50/538* (2021.01); *H01M 10/0525* (2013.01); *H01M 50/60* (2021.01)

(58) Field of Classification Search
    CPC ............. H01M 50/183; H01M 50/531; H01M 50/538; H01M 10/0525; H01M 50/60
    See application file for complete search history.

(56) References Cited

U.S. PATENT DOCUMENTS

| | | |
|---|---|---|
| 2013/0149586 A1 | 6/2013 | Hong |
| 2014/0302379 A1* | 10/2014 | Nam ....................... H01M 2/30 429/158 |
| 2014/0302380 A1 | 10/2014 | Song |
| 2015/0179992 A1 | 6/2015 | Harayama |
| 2015/0214516 A1 | 7/2015 | Jang et al. |

FOREIGN PATENT DOCUMENTS

| | | |
|---|---|---|
| CN | 104810498 A | 7/2015 |
| JP | H08-329925 A | 12/1996 |
| JP | 2006-019284 A | 1/2006 |
| JP | 2009-076385 A | 4/2009 |
| JP | 2009-289593 A | 12/2009 |
| JP | 2012-243405 A | 12/2012 |
| JP | 2014-203824 A | 10/2014 |
| JP | 2015-141896 A | 8/2015 |
| JP | 2016-044303 A | 4/2016 |
| WO | WO-2016/076108 A1 | 5/2016 |
| WO | WO-2017/159760 A1 | 9/2017 |

OTHER PUBLICATIONS

Supplementary European Search Report issued in corresponding European patent application No. 17845938.4 dated Mar. 24, 2020.
Office Action dated Jan. 22, 2021, in Chinese Application No. 201780048219.0.
Xu et al., "Theories and Technologies on Surface Engineering," Defense Industry Press, (Jul. 31, 1999) pp. 462.

* cited by examiner (a)                                      (b)

PRISMATIC SECONDARY BATTERY

TECHNICAL FIELD

The present invention relates to a prismatic secondary battery having an electrode terminal supported by a lid of a battery can via an insulating member.

BACKGROUND ART

As a conventional example, PTL 1 discloses a prismatic secondary battery in which a power generating body is contained in a metal battery case having a bottomed quadrilateral box shape having a rectangular opening in one end, and the opening is hermetically sealed by a rectangular plate-like metal lid member fixed to the battery case, wherein one end (a lower end) of a metal terminal plate (current collector plate) is electrically connected to the power generating body inside the battery case, the other end (an upper end) penetrates a through hole formed in the lid member in a non-contact state with the lid member and protrudes in an outward (upward) direction of the lid member, and the through hole is sealed by an insulating mold portion made of a synthetic resin molded on the lid member by insert molding including the other end side of the terminal plate.

CITATION LIST

Patent Literature

PTL 1: JP 2012-243405 A

SUMMARY OF INVENTION

Technical Problem

In the prismatic secondary battery of the conventional example, the metal terminal plate (current collector plate) inserted into the battery case is processed such that the battery case side of the metal terminal plate (current collector plate) is bent or drawn by pressing. Then, at the time of insert molding, the metal terminal plate (current collector plate) is inserted into the opening of the rectangular plate-like metal lid member in the mold. Therefore, there is a possibility that the mold structure becomes complicated and the productivity is reduced. Furthermore, in a case where the battery case and the power generating body are shifted from each other, there is a possibility that the mounting density is reduced.

The present invention has been made in view of the above points, and an object of the present invention is to provide a prismatic secondary battery with improved productivity and mounting density.

Solution to Problem

To solve the above problem, a prismatic secondary battery according to one aspect of the present invention is a prismatic secondary battery including a battery container containing an electric storage element and having a pair of wide surfaces, a pair of narrow surfaces, a bottom surface, and an opening, a lid having a first through hole and a second through hole and closing the opening of the battery container, a flat plate-like first current collector plate inserted into the first through hole and extending in a straight line toward the bottom surface, and a flat plate-like second current collector plate inserted into the second through hole and extending in a straight line toward the bottom surface, in which the first current collector plate and the second current collector plate are made of metal materials different from each other as main materials, and an insertion position of the first current collector plate deviates on a side of one of the wide surfaces with respect to an insertion position of the second current collector plate.

Advantageous Effects of Invention

According to the present invention, deviation of center positions of a wound electrode group and a battery container can be suppressed, and a prismatic secondary battery with improved mounting density can be provided. Note that problems, configurations, and effects other than those described above will be clarified from description of the following embodiments.

DESCRIPTION OF EMBODIMENTS

Hereinafter, embodiments of the present invention will be described with reference to the drawings.

First Embodiment

Figure 1:
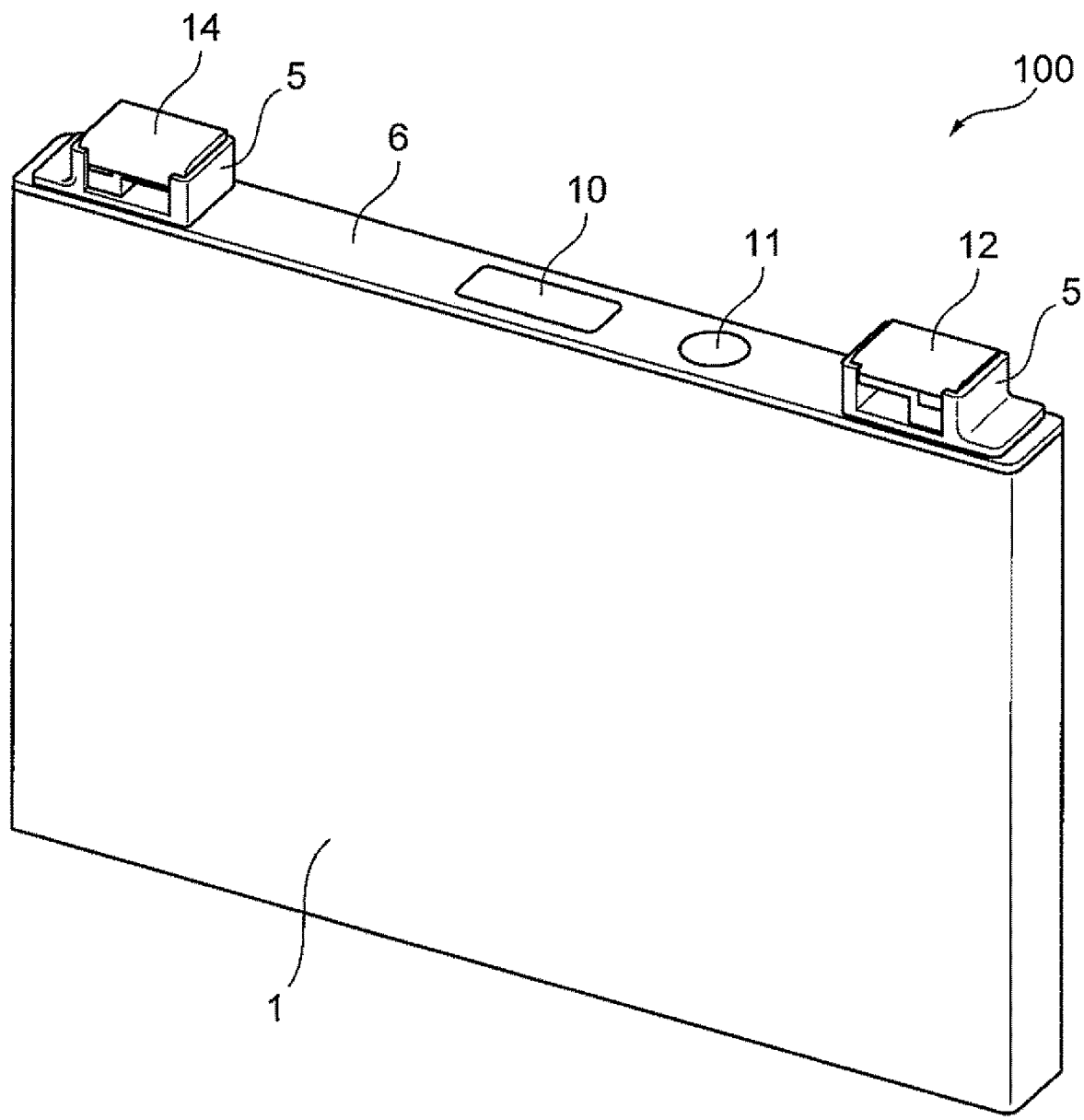
FIG. 1 is an external perspective view of a prismatic secondary battery.

FIG. 1 is an external perspective view of a prismatic secondary battery.
The prismatic secondary battery 100 includes a battery can (battery container) 1 and a lid 6. The battery can 1 and the lid 6 are made of a metal material such as an aluminum alloy, for example, and are formed by deep drawing and pressing.
In the battery can 1, a wound electrode group 3 (see FIG. 2) as an electric storage element is built in, and the opening 1a of the battery can 1 is sealed with a lid 6. The lid 6 has a substantially rectangular flat plate shape and is welded so as to close the opening 1a of the battery can 1 to seal the battery can 1. The lid 6 is provided with a positive electrode output portion 14 and a negative electrode output portion 12. The prismatic secondary battery 100 is charged via the positive electrode output portion 14 and the negative electrode output portion 12, and power is supplied to the external load. A gas discharge valve 10 is integrally provided in the lid 6, and when the pressure inside the battery can 1 rises, the gas discharge valve 10 opens, gas is discharged from the inside, and the pressure inside the battery can 1 is reduced. As a result, the safety of the prismatic secondary battery 100 is secured.

Figure 2:
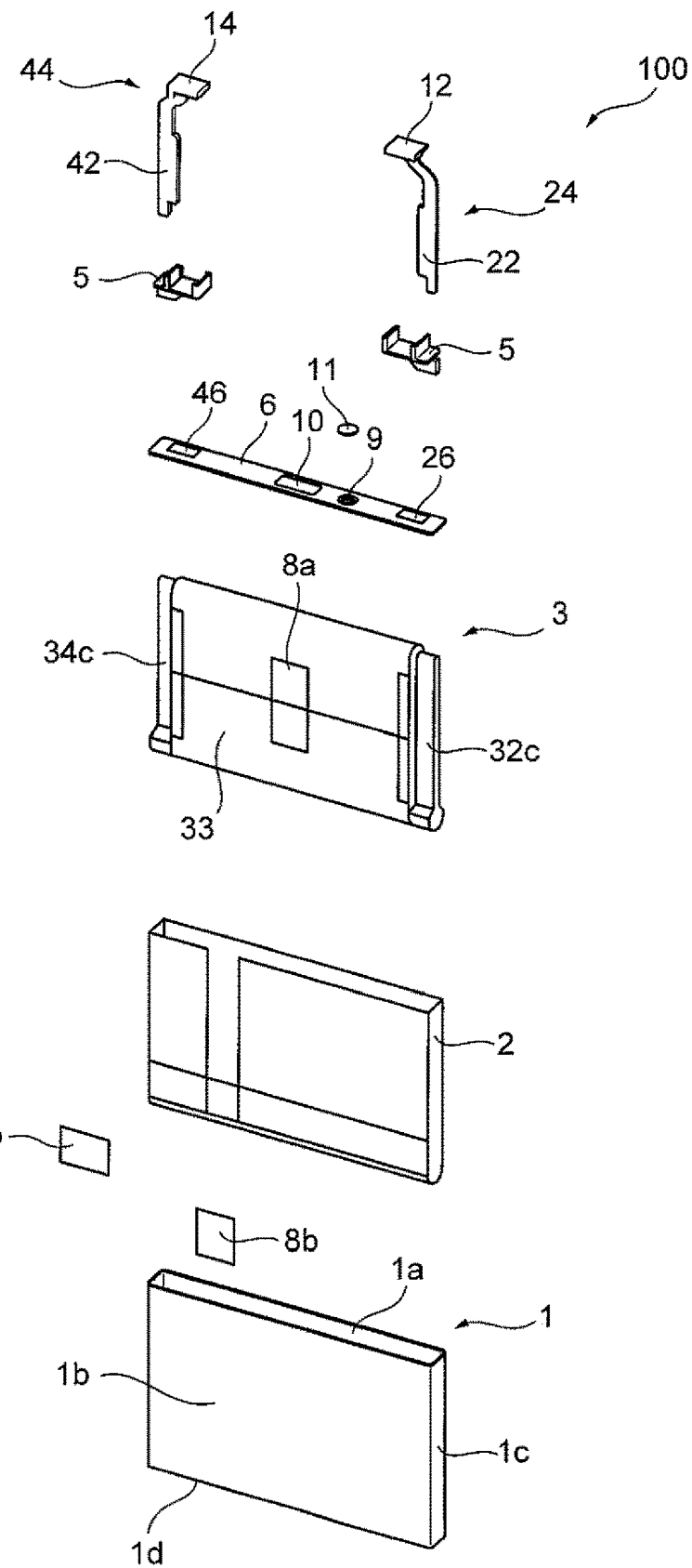
FIG. 2 is an exploded perspective view of the prismatic secondary battery.

FIG. 2 is an exploded perspective view of the prismatic secondary battery.

The battery can 1 of the prismatic secondary battery 100 has a rectangular bottom surface 1d, wide surfaces 1b rising from a pair of long sides of the bottom surface 1d, narrow surfaces 1c rising from a pair of short sides of the bottom surface 1d, and an opening 1a opening upward in upper ends of the wide surfaces 1b and the narrow surfaces 1c. In the battery can 1, the wound electrode group 3 is contained in a state of being wrapped with an insulating protective film 2.

The wound electrode group 3 is constituted by winding a band-shaped electrode in a flat shape, and has a pair of curved portions facing each other and having a semicircular shape in section, and planar portions continuously formed between the pair of curved portions. The wound electrode group 3 is inserted into the battery can 1 from one curved portion side to face the bottom surface 1d such that a winding axis direction goes along a lateral width direction of the battery can 1 and the other curved portion side is arranged on the opening 1a side.

A positive electrode foil exposed portion 34c of the wound electrode group 3 is welded and joined to a positive electrode current collector plate 44 and is electrically connected to the positive electrode output portion 14 exposed from the lid 6. Further, a negative electrode foil exposed portion 32c of the wound electrode group 3 is welded and joined to a negative electrode current collector plate 24 and is electrically connected to the negative electrode output portion 12 exposed from the lid 6. With the configuration, the power is supplied from the wound electrode group 3 to the external load via the positive electrode current collector plate 44 and the negative electrode current collector plate 24, and externally generated power is supplied and charged to the wound electrode group 3 via the positive electrode current collector plate 44 and the negative electrode current collector plate 24.

Figure 4:
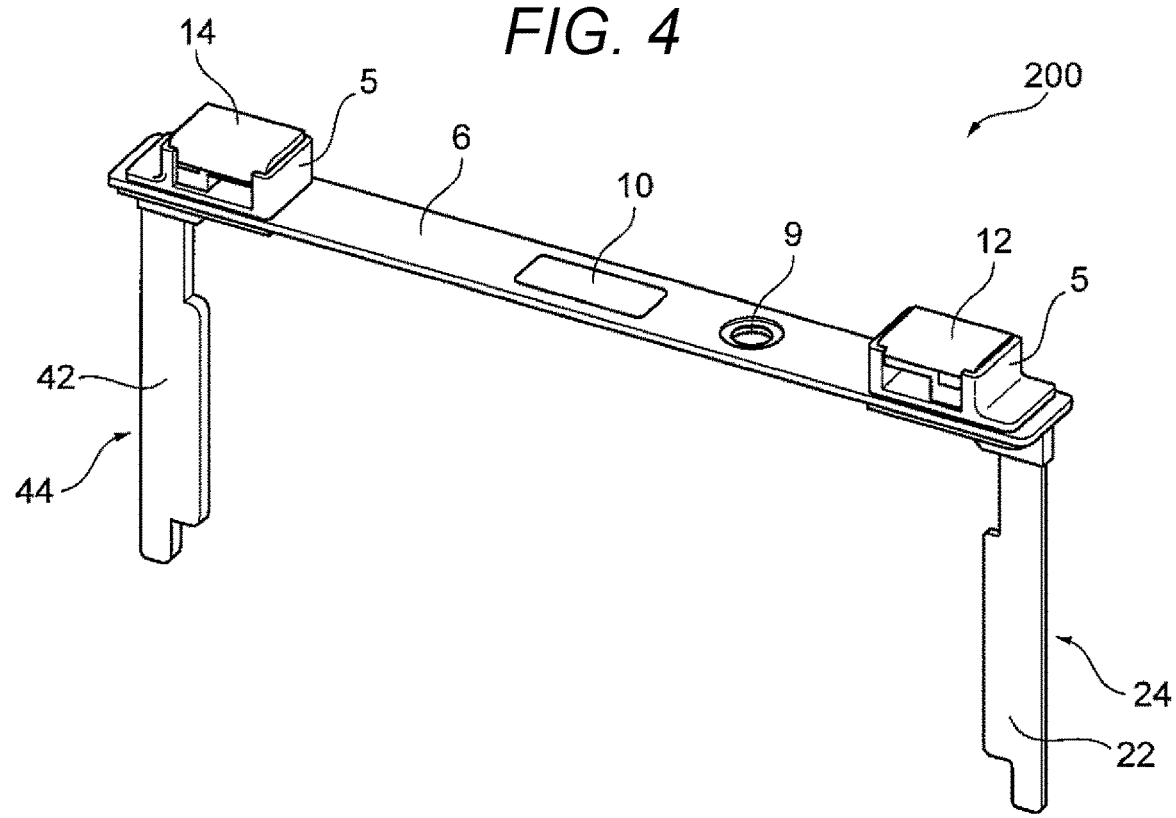
FIG. 4 is a perspective view of a lid assembly of a first embodiment.

The positive electrode current collector plate 44 and the negative electrode current collector plate 24 are fixed to the lid 6 by insert molding with an insulating member 5 and constitute a lid assembly in cooperation with the lid 6 (see FIG. 4). The positive electrode current collector plate 44 and the negative electrode current collector plate 24 have a positive electrode connection portion 42 and a negative electrode connection portion 22 to which the positive electrode foil exposed portion 34c and the negative electrode foil exposed portion 32c of the wound electrode group 3 are respectively welded and joined, and the wound electrode group 3 is integrally attached to the lid assembly. The positive electrode connection portion 42 and the positive electrode foil exposed portion 34c, and the negative electrode connection portion 22 and the negative electrode foil exposed portion 32c are welded and joined by ultrasonic welding, spot welding, or the like. Then, the wound electrode group 3 is inserted into the battery can 1, the opening 1a of the battery can 1 is closed with the lid 6, the lid 6 is joined to the battery can 1 by laser welding, and the opening 1a is sealed. Then, after injecting an electrolytic solution into the battery can 1 through a liquid injection hole 9, a liquid injection plug 11 is joined to the lid 6 by laser welding to seal the liquid injection hole 9, thereby to tightly close the prismatic secondary battery 100.

The positive electrode current collector plate 44 and the negative electrode current collector plate 24 are made of different metal materials from each other as main materials. In the present embodiment, an example of the material for forming the positive electrode current collector plate 44 includes an aluminum alloy and an example of the material for forming the negative electrode current collector plate 24 includes a copper alloy. Further, examples of the material for forming the insulating member 5 include resin members having insulating properties such as polybutylene terephthalate, polyphenylene sulfide, and a perfluoroalkoxy fluorine resin.

Then, as the electrolytic solution to be injected into the battery can 1, a nonaqueous electrolytic solution in which a lithium salt such as lithium hexafluorophosphate ($LiPF_6$) is dissolved in a carbonate ester organic solvent such as ethylene carbonate can be applied.

The positive electrode current collector plate 44 and the negative electrode current collector plate 24 are integrally formed with the positive electrode output portion 14 and the negative electrode output portion 12 exposed from the lid 6. Each of the positive electrode output portion 14 and the negative electrode output portion 12 has a welded joint portion to be welded and joined to a bus bar or the like. The welded joint portion has a flat surface arranged above the insulating member 5 in parallel with an outer surface of the lid 6 and the bus bar or the like is brought into contact with and welded and joined to the flat surface.

The positive electrode current collector plate 44 and the negative electrode current collector plate 24 are formed into flat plate shapes inserted into a positive electrode-side through hole 46 and a negative electrode-side through hole 26 and extending in a straight line toward the bottom surface along the wide surfaces of the battery can 1. The positive electrode current collector plate 44 and the negative electrode current collector plate 24 have distal ends extending up to positions facing the positive electrode foil exposed portion 34c and the negative electrode foil exposed portion 32c so that the positive electrode connection portion 42 and the negative electrode connection portion 22 can be stacked and connected to the positive electrode foil exposed portion 34c and the negative electrode foil exposed portion 32c of the wound electrode group 3.

A periphery of the wound electrode group 3 is covered with the insulating protective film 2. The insulating protective film 2 is attached to wind around a direction along the flat surface of the wound electrode group 3 and orthogonal to the winding axis direction of the wound electrode group 3 as a central axis direction. The insulating protective film 2 is formed of a single sheet or a plurality of film members made of a synthetic resin such as polypropylene (PP), for example.

Figure 3:
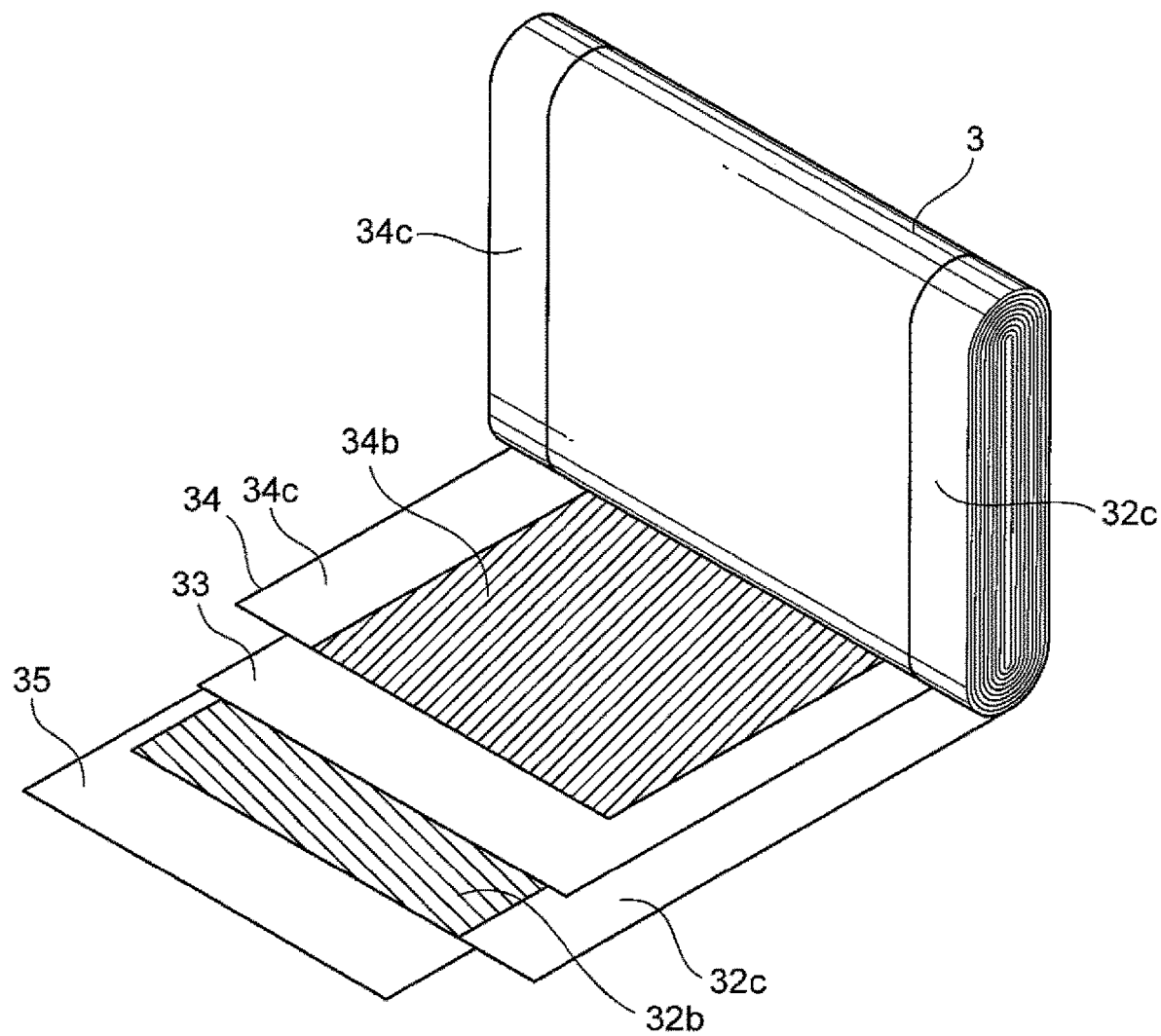
FIG. 3 is an exploded perspective view of a wound electrode group.

FIG. 3 is an exploded perspective view illustrating a state in which a part of the wound electrode group is developed.

The wound electrode group 3 is constituted by winding a negative electrode 32 and a positive electrode 34 with separators 33 and 35 interposed therebetween in a flat manner. In the wound electrode group 3, an outermost electrode is the negative electrode 32, and the separators 33 and 35 are further wound around the negative electrode 32. The separators 33 and 35 serve to insulate the positive electrode 34 from the negative electrode 32.

A negative electrode mixture layer 32b of the negative electrode 32 is formed to be larger in a width direction than a positive electrode mixture layer 34b of the positive electrode 34. In a case where the positive electrode 34 and the negative electrode 32 are stacked and wound, the positive electrode mixture layer 34b is always sandwiched by the negative electrode mixture layer 32b. The positive electrode foil exposed portion 34c and the negative electrode foil exposed portion 32c are bundled in a flat thickness direction at a planar portion of the wound electrode group 3 and the positive electrode connection portion 42 of the positive electrode current collector plate 44 and the negative electrode connection portion 22 of the negative electrode current collector plate 24 are welded and joined. Although the separators 33 and 35 are wider in the width direction than a portion where the negative electrode mixture layer 32b is applied, the separators 33 and 35 are wound at positions of end portions where the metal foils are exposed by the positive electrode foil exposed portion 34c and the negative electrode foil exposed portion 32c, and thus does not affect the bundling and welding.

The positive electrode 34 is constituted by applying a positive electrode active material mixture to both surfaces of a positive electrode foil that is a positive electrode current collector, and the positive electrode foil exposed portion 34c where no positive electrode active material mixture is applied is provided on an end portion on one side in the width direction of the positive electrode foil. The negative electrode 32 is constituted by applying a negative electrode active material mixture to both surfaces of a negative electrode foil that is a negative electrode current collector, and the negative electrode foil exposed portion 32c where no negative electrode active material mixture is applied is provided on an end portion on the other side in the width direction of the negative electrode foil. The positive electrode foil exposed portion 34c and the negative electrode foil exposed portion 32c are regions where a metal surface of the electrode foil is exposed. The positive electrode 34 and the negative electrode 32 are stacked and wound such that the positive electrode foil exposed portion 34c and the negative electrode foil exposed portion 32c are separately arranged at positions on one side and on the other side in the winding axis direction, thereby constituting the wound electrode group 3.

The positive electrode foil and the negative electrode foil are made of different metal materials from each other and have different thicknesses. In the present embodiment, the positive electrode foil is made of an aluminum foil and the negative electrode foil is made of a copper foil, and the positive electrode foil is thicker in thickness than the negative electrode foil. Therefore, in a case where the positive electrode foil exposed portion 34c and the negative electrode foil exposed portion 32c are bundled at the planar portion of the wound electrode group 3 in the flat thickness direction, the positive electrode foil exposed portion 34c is thicker in thickness than the negative electrode foil exposed portion 32c.

Regarding the negative electrode 32, 10 parts by weight of polyvinylidene fluoride (hereinafter referred to as PVDF) as a binder was added to 100 parts by weight of amorphous carbon powder as a negative electrode active material, and N-methylpyrrolidone (hereinafter referred to as NMP) as a dispersion solvent was added thereto and kneaded to prepare a negative electrode mixture. This negative electrode mixture was applied on both surfaces of the copper foil (negative electrode foil) having the thickness of 10 μm while leaving welded portions (negative electrode uncoated portions). After that the negative electrode 32 with a negative electrode active material coated portion containing no copper foil having the thickness of 70 μm was obtained through a drying process, a press process, and a cutting process.

Note that, in the present embodiment, the case where amorphous carbon is used as the negative electrode active material has been exemplified. However, the present embodiment is not limited to the example, and natural graphite capable of inserting and releasing lithium ions, various artificial graphite materials, carbonaceous materials such as coke, or compounds such as Si or Sn (for example, SiO or $TiSi_2$), or composite materials thereof may be adopted. Further, the particle shape may be a scaly shape, a spherical shape, a fibrous shape, a lumpy shape, or the like, which is not particularly limited.

Regarding the positive electrode 34, 10 parts by weight of scaly graphite as a conductive material and 10 parts by weight of PVDF as a binder were added to 100 parts by weight of lithium manganate (chemical formula $LiMn_2O_4$) as a positive electrode active material, and NMP as a dispersion solvent was added thereto and kneaded to prepare a positive electrode mixture. This positive electrode mixture was applied on both surfaces of the aluminum foil (positive electrode foil) having the thickness of 20 μm while leaving welded portions (positive electrode uncoated portions). After that the positive electrode 31 with a positive electrode active material coated portion containing no aluminum foil having the thickness of 90 μm was obtained through a drying process, a press process, and a cutting process.

Further, in the present embodiment, the case of using lithium manganate as the positive electrode active material has been exemplified. However, another lithium manganate having a spinel crystal structure, a lithium manganese composite oxide in which a part is substituted or doped with a metal element, lithium cobalt oxide or lithium titanate having a layered crystal structure, or a lithium-metal composite oxide in which a part of the above-described substance is substituted or doped with a metal element may be used.

Further, in the present embodiment, the case where PVDF is used as the binder in the coated portions of the positive electrode and the negative electrode has been exemplified. However, polymers such as polytetrafluoroethylene (PTFE), polyethylene, polystyrene, polybutadiene, butyl rubber, nitrile rubber, styrene butadiene rubber, polysulfide rubber, nitrocellulose, cyanoethyl cellulose, various latexes, acrylonitrile, vinyl fluoride, vinylidene fluoride, propylene fluoride, chloroprene fluoride, and an acrylic resin, and a mixture of the aforementioned polymers can be used.

Further, as a shaft core, for example, a core formed by winding a resin sheet having higher flexural rigidity than any of the positive electrode foil, the negative electrode foil, and the separators 33 and 35 can be used.

Figure 5:
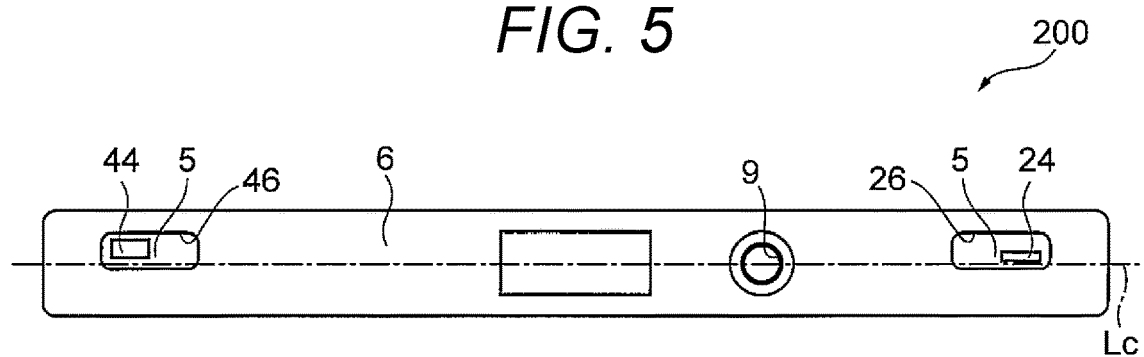
FIG. 5 is a partial cross-sectional view of the lid assembly of the first embodiment.
Figure 6:
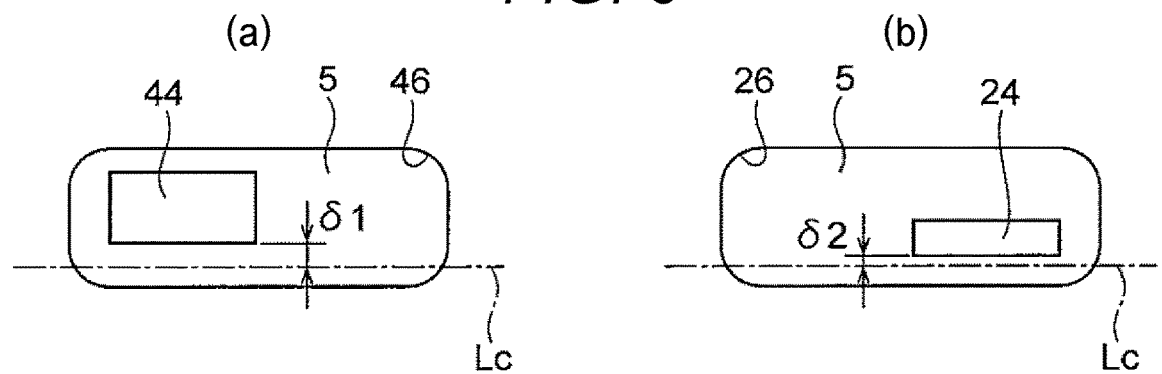
FIG. 6 is enlarged views of main portions of FIG. 5.

FIG. 4 is a perspective view of the lid assembly of the first embodiment, FIG. 5 is a partial cross-sectional view of the lid assembly of the first embodiment, and FIG. 6 is enlarged views of main portions of FIG. 5. FIG. 5 is a plan view of the lid assembly, illustrating a partial cross-sectional in which the lid assembly is partially cut along an upper surface of the lid, FIG. 6(a) illustrates a partial cross section on the positive electrode side and FIG. 6(b) illustrates a partial cross section on the negative electrode side.

The positive electrode current collector plate 44 and the negative electrode current collector plate 24 are formed into flat plate shapes inserted into the positive electrode-side through hole 46 and the negative electrode-side through hole 26 provided in the lid 6 and extending in a straight line toward the bottom surface 1d along the wide surfaces 1b of the battery can 1. The term "straight line" refers to a state without having a bending process and a drawing process, and variation of material thickness due to a press process, a cutting process, and a finishing process is included in the definition of the straight line.

By making the positive electrode current collector plate 44 and the negative electrode current collector plate 24 be in the straight line, the operation to insert the positive electrode-side through hole 46 and the negative electrode-side through hole 26 becomes easy, and the assemblability of the lid assembly is improved. In particular, when performing insert molding, arrangement of parts inside the mold becomes easy, and thus improvement of the productivity can be expected. The positive electrode current collector plate 44 and the negative electrode current collector plate 24 are made of different metal materials from each other as main materials and have different plate thicknesses from each other. In the present embodiment, the positive electrode current collector plate 44 made of an aluminum alloy is thicker in the plate thickness than the negative electrode current collector plate 24 made of a copper alloy.

As described above, the positive electrode current collector plate 44 and the negative electrode current collector plate 24 of the lid assembly illustrated in FIG. are integrally fixed to the lid 6 with the insulating member 5 in the state where the positive electrode current collector plate 44 and the negative electrode current collector plate 24 are inserted in the positive electrode-side through hole 46 and the negative electrode-side through hole 26 of the lid 6 by insert molding. As a result, the positive electrode-side through hole 46 and the negative electrode-side through hole 26 of the lid 6 are hermetically sealed with the insulating member 5. The insulating member 5 is arranged between the positive electrode current collector plate 44 and the positive electrode-side through hole 46 and between the negative electrode current collector plate 24 and the negative electrode-side through hole 26 to seal gaps therebetween.

When fixing the insulating member 5 and the lid 6, or the insulating member 5 and the positive electrode current collector plate 44 and the negative electrode current collector plate 24 by insert molding, roughening treatment is performed for an adhesion portion of the metal parts, whereby the metal and the insulating member 5 can strongly adhere and the hermeticity can be enhanced. In the present embodiment, the roughening treatment is applied to the entire surface of the lid 6 and the entire surfaces of the positive electrode current collector plate 44 and the negative electrode current collector plate 24. The roughening treatment may be applied limiting a range covered with the insulating member 5. For example, the roughening treatment may be applied only to a portion of the lid 6, the portion being covered with the insulating member 5, and portions of the positive electrode current collector plate 44 and the negative electrode current collector plate 24, the portions being covered with the insulating member 5.

As illustrated in FIG. 5, the lid 6 is provided at a position where the positive electrode-side through hole 46 and the negative electrode-side through hole 26 deviate on a side of one of the wide surfaces with respect to the center Lc of the lid 6. In the example illustrated in FIG. 5, both the positive electrode-side through hole 46 and the negative electrode-side through hole 26 are provided at positions deviating to an upper side in FIG. 5. In the present embodiment the positive electrode-side through hole 46 and the negative electrode-side through hole 26 have the same size.

Then, as illustrated in FIG. 6, regarding the positive electrode current collector plate 44 and the negative electrode current collector plate 24, an insertion position of the positive electrode current collector plate 44 inserted in the positive electrode-side through hole 46 of the lid 6 deviates on a side of one wide surface with respect to an insertion position of the negative electrode current collector plate 24 inserted in the negative electrode-side through hole 26 of the lid 6. In the present embodiment, the positive electrode current collector plate 44 is arranged at a position separated from a center Lc of the lid by δ1 and the negative electrode current collector plate 24 is arranged at a position separated from the center Lc of the lid by δ2, and a deviation width from the center Lc of the lid 6 of the positive electrode current collector plate 44 is larger than that of the negative electrode current collector plate 24 (δ1>δ2).

In the wound electrode group 3, the positive electrode foil exposed portion 34c is thicker in the thickness than the negative electrode foil exposed portion 32c when bundled. Then, δ1 is set to about half the thickness when the positive electrode foil exposed portion 34c of the wound electrode group 3 is bundled, and δ2 is set to about half the thickness when the negative electrode foil exposed portion 32c of the wound group 3 is bundled.

Therefore, the positive electrode connection portion 42 of the positive electrode current collector plate 44 is brought into contact with the positive electrode foil exposed portion 34c of the wound electrode group 3 from the side of one wide surface, and the negative electrode connection portion 22 of the negative electrode current collector plate 24 is brought into contact with the negative electrode foil exposed portion 32c of the wound electrode group 3 from the side of one wide surface, whereby a center of the wound electrode group 3 in the flat thickness direction can be arranged to coincide with the center Lc of the lid 6.

Center deviation of the wound electrode group 3 and the lid 6 can be suppressed by the arrangement relationship when the positive electrode foil and the negative electrode foil having different thicknesses are bundled and welded to the positive electrode current collector plate 44 and the negative electrode current collector plate 24. Therefore, since the center of the wound electrode group 3 in the flat thickness direction coincides with the center Lc of the lid 6, a necessary gap between the wound electrode group 3 and the battery can 1 can be minimized when the wound electrode group 3 of the lid subassembly is inserted into the battery can 1, whereby the mounting density is improved and a high-capacity battery can be realized.

In the present embodiment, a gap between the positive electrode-side through hole 46 and the positive electrode current collector plate 44 and a gap between the negative electrode-side through hole 26 and the negative electrode current collector plate 24 are provided by 0.3 mm or more. Therefore, the fluidity of the insulating resin at the time of insert molding is improved, and the productivity is improved.

According to the present embodiment, since the positive electrode current collector plate 44 and the negative electrode current collector plate 24 are formed in the flat plate shape extending in the straight line, the positive electrode current collector plate 44 and the negative electrode current collector plate 24 can be easily inserted into the positive electrode-side through hole 46 and the negative electrode-side through hole 26 of the lid 6, whereby the assemblability of the lid assembly can be improved. Then, by making the insertion positions of the positive electrode current collector plate 44 and the negative electrode current collector plate 24 deviate on the side of the one wide surface to have different distances from each other from the center Lc of the lid, considering the difference in the thickness between the positive electrode foil and the negative electrode foil of the wound electrode group 3, thereby to suppress the positional deviation between the center of the wound electrode group 3 and the center of the battery can 1 and improve the mounting density.

Further, in the present embodiment, since both the positive electrode-side through hole 46 and the negative electrode-side through hole 26 deviate on the side of one wide surface with respect to the center of the lid 6, the wound electrode group 3 can be brought close to the positive electrode connection portion 42 of the positive electrode current collector plate 44 and the negative electrode connection portion 22 of the negative electrode current collector plate 24 from a side of the other wide surface, and the positive electrode foil exposed portion 34c and the negative electrode foil exposed portion 32c can be brought into contact with and joined to the positive electrode connection portion 42 and the negative electrode connection portion 22, when the wound electrode group 3 is attached to the lid assembly. Therefore, the wound electrode group 3 can be mounted by a simple layering operation method and manufacturing can be facilitated.

Second Embodiment

Figure 7:
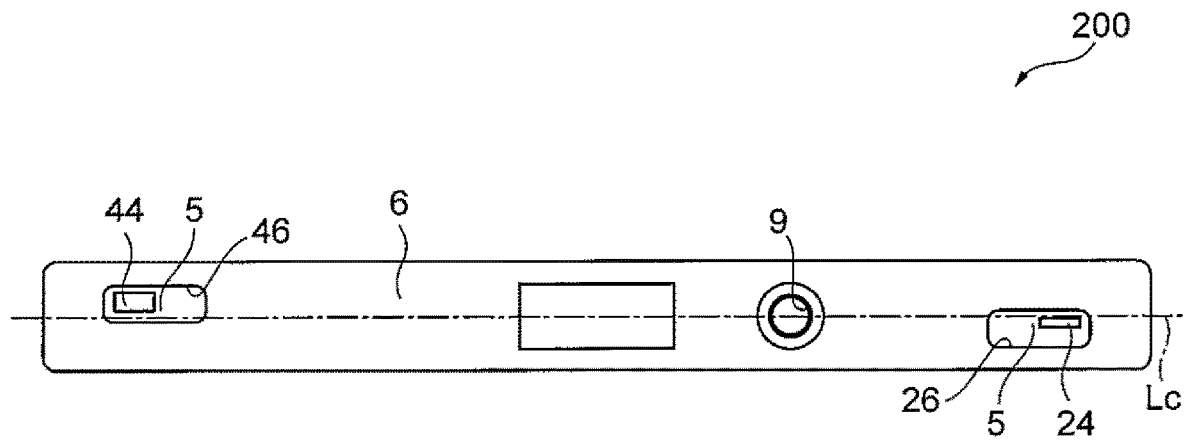
FIG. 7 is a partial cross-sectional view of a lid assembly of a second embodiment.
Figure 8:
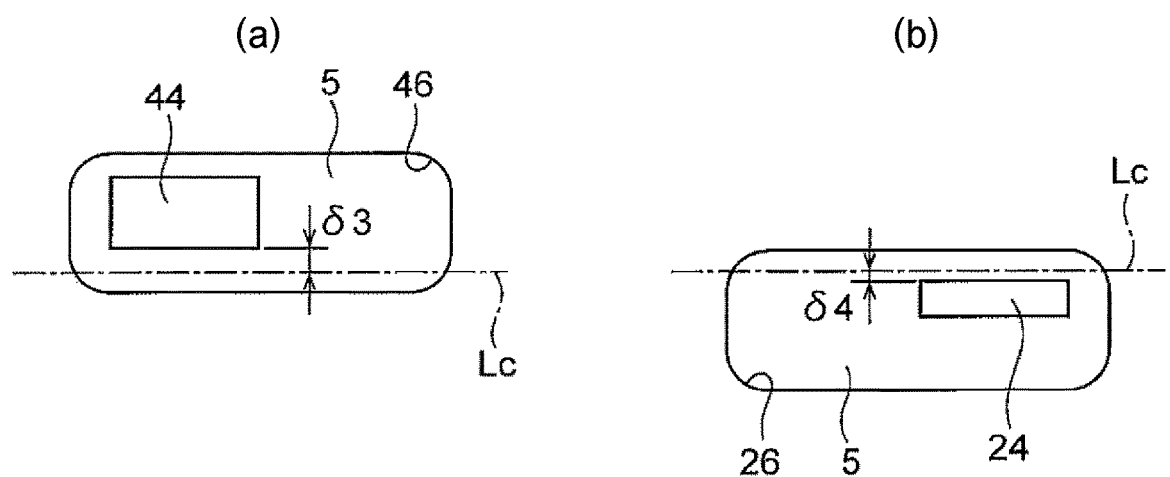
FIG. 8 is enlarged views of main portions of FIG. 7.

FIG. 7 is a partial cross-sectional view of a lid assembly of a second embodiment, and FIG. 8 is enlarged views of main parts of FIG. 7. Note that the same reference numerals are given to similar constituent elements to those in the above-described embodiment, and detailed description thereof is omitted.

Characteristics in the present embodiment are that a positive electrode-side through hole 46 and a positive electrode current collector plate 44 are arranged on a side of one wide surface and a negative electrode-side through hole 26 and a negative electrode current collector plate 24 are arranged on a side of the other wide surface with respect to a center Lc of a lid 6.

In the present embodiment, as illustrated in FIG. 7, the positive electrode-side through hole 46 is provided on the side of one wide surface and the negative electrode-side through hole 26 is provided on the side of the other wide surface. Then, as illustrated in FIG. 8, an insertion position of the positive electrode current collector plate 44 inserted in the positive electrode-side through hole 46 of the lid 6 deviates on the side of one wide surface on the basis of the center Lc of the lid 6. Then, an insertion position of the negative electrode current collector plate 24 inserted in the negative electrode-side through hole 26 of the lid 6 deviates on the side of the other wide surface on the basis of the center Lc of the lid 6. In the present embodiment, the positive electrode current collector plate 44 is arranged at a position separated from the center Lc of the lid by δ3 on the side of one wide surface and the negative electrode current collector plate 24 is arranged at a position separated from the center Lc of the lid by δ4 on the side of the other wide surface, and a deviation width from the center Lc of the lid 6 of the positive electrode current collector plate is larger than that of the negative electrode current collector plate 24 (δ3>δ4).

δ3 is set to about half the thickness when the positive electrode foil exposed portion 34c of the wound electrode group 3 is bundled, and δ4 is set to about half the thickness when the negative electrode foil exposed portion 32c of the wound group 3 is bundled. Therefore, the positive electrode connection portion 42 of the positive electrode current collector plate 44 is brought into contact with the positive electrode foil exposed portion 34c of the wound electrode group 3 from the side of one wide surface, and the negative electrode connection portion 22 of the negative electrode current collector plate 24 is brought into contact with the negative electrode foil exposed portion 32c of the wound electrode group 3 from the side of the other wide surface, whereby a center of the wound electrode group 3 in the flat thickness direction can be arranged to coincide with the center Lc of the lid 6.

Center deviation of the wound electrode group 3 and the lid 6 can be suppressed by the arrangement relationship when the positive electrode foil and the negative electrode foil having different thicknesses are bundled and welded to the positive electrode current collector plate 44 and the negative electrode current collector plate 24, similarly to the first embodiment. Therefore, since the center of the wound electrode group 3 in the flat thickness direction coincides with the center Lc of the lid 6, a necessary gap between the wound electrode group 3 and the battery can 1 can be minimized when the wound electrode group 3 of the lid subassembly is inserted into the battery can 1, whereby the mounting density is improved and a high-capacity battery can be realized.

In the present embodiment, a gap between the positive electrode-side through hole 46 and the positive electrode current collector plate 44 and a gap between the negative electrode-side through hole 26 and the negative electrode current collector plate 24 are provided by 0.3 mm or more. Therefore, the fluidity of the insulating resin at the time of insert molding is improved, and the productivity is improved.

According to the present embodiment, since the positive electrode current collector plate 44 and the negative electrode current collector plate 24 are formed in the flat plate shape extending in the straight line, the positive electrode current collector plate 44 and the negative electrode current collector plate 24 can be easily inserted into the positive electrode-side through hole 46 and the negative electrode-side through hole 26 of the lid 6, whereby the assemblability of the lid assembly can be improved, similarly to the first embodiment. Then, by making the insertion positions of the positive electrode current collector plate 44 and the negative electrode current collector plate 24 deviate on the side of the one wide surface and on the side of the other wide surface to have different distances from each other from the center Lc of the lid, considering the difference in the thickness between the positive electrode foil and the negative electrode foil of the wound electrode group 3, thereby to suppress the positional deviation between the center of the wound electrode group 3 and the center of the battery can 1 and improve the mounting density.

According to the present embodiment, the positive electrode-side through hole 46 and the negative electrode-side through hole 26 are arranged at positions separated from each other on a diagonal line of the lid 6. Therefore, in a case where the positive electrode-side through hole 46 and the negative electrode-side through hole 26 are formed in the lid 6 by pressing, a pressure is equally applied to a short side direction of the lid 6, and distortion of the lid 6 can be prevented.

Third Embodiment

Figure 9:
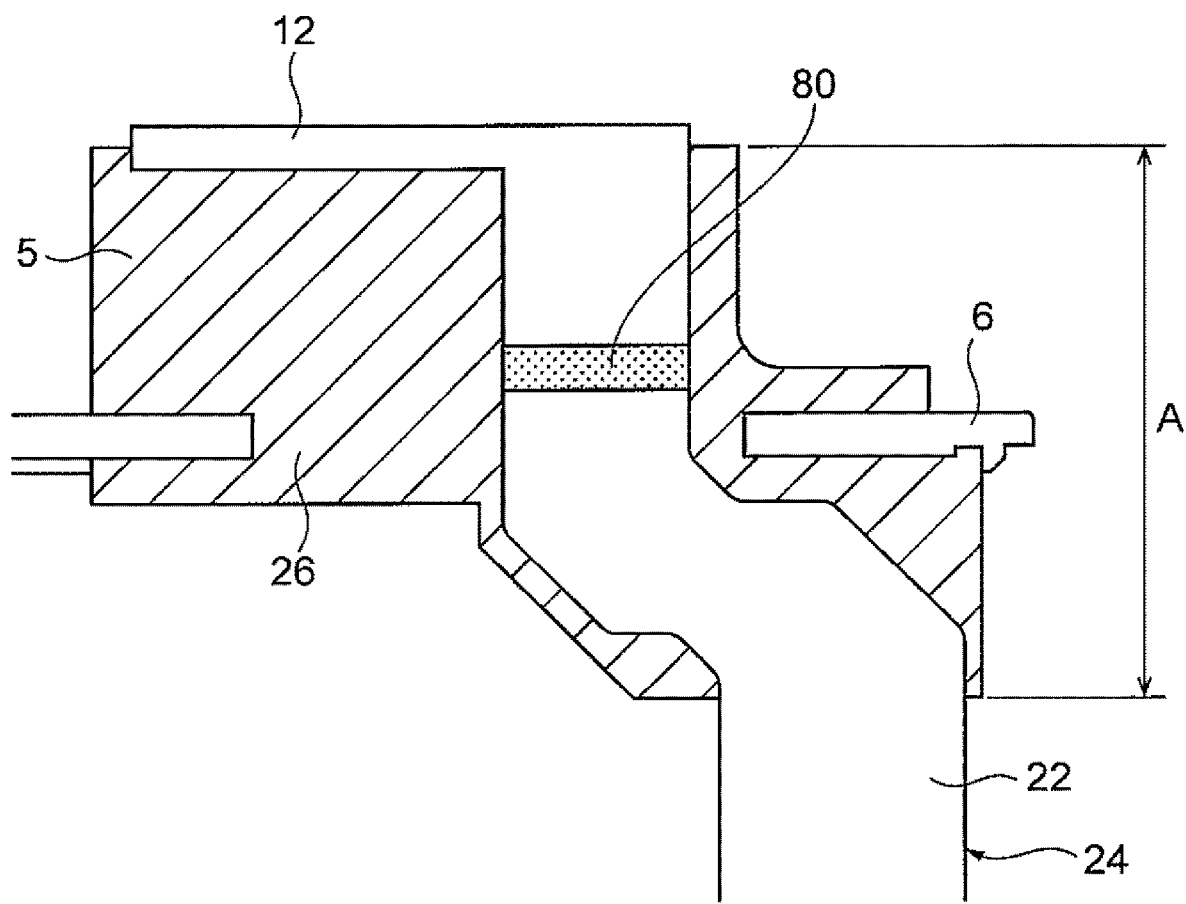
FIG. 9 is a partial cross-sectional view of an insulating member of a lid assembly of a third embodiment.

FIG. 9 is a partial cross-sectional view of an insulating member of a lid assembly of a third embodiment. Note that the same reference numerals are given to similar constituent elements to those in the above-described first and second embodiments, and detailed description thereof is omitted.

Characteristics in the present embodiment are that, in the above-described first or second embodiments, the negative electrode current collector plate 24 is constituted using a cladding material and a cladding conversion portion 80 of the negative electrode current collector plate 24 is arranged at a position covered with an insulating resin.

The negative electrode current collector plate 24 is constituted using a clad material formed by joining dissimilar metals by cladding. Specifically, a negative electrode connection portion 22 of a copper alloy and a negative electrode output portion 12 of an aluminum alloy are joined by cladding with the cladding conversion portion 80. Then, the cladding conversion portion 80 is arranged in a portion covered with an insulating member 5 and is in a state where contact with the outside is deprived. Therefore, generation of a metal compound at an interface of the cladding conversion portion 80 can be suppressed.

In the present embodiment, the negative electrode output portion 12 is constituted by an aluminum alloy, whereby a bus bar joined to the negative electrode output portion 12 can be made of an aluminum alloy, and can be of the same material as a bus bar joined to the positive electrode output portion 14. Therefore, preparation of two types of bus bars is not necessary and the cost can be suppressed to be low.

Note that, in the example illustrated in FIG. 9, only the configuration on the negative electrode side has been illustrated. However, an embodiment is not limited to the example as long as either the positive electrode side or the negative electrode side has the configuration, and the positive electrode side may have a similar configuration in place of the negative electrode side.

Although the embodiments of the present invention have been described in detail, the present invention is not limited to the above-described embodiments, and various design changes can be made without departing from the spirit of the present invention described in the claims. For example, the above embodiments have been described in detail for describing the present invention in an easy-to-understand manner, and the present invention is not necessarily limited to one including all the described configurations. Further, a part of the configuration of a certain embodiment can be replaced with the configuration of another embodiment. Further, the configuration of another embodiment can be added to the configuration of a certain embodiment. Further, another configuration can be added to/deleted from/replaced with a part of the configurations of the embodiments.

REFERENCE SIGNS LIST

1 battery can (battery container)
1*a* opening
1*b* wide surface
1*c* narrow surface
1*d* bottom surface
2 insulating protective film
3 wound electrode group
5 insulating member (resin member)
6 lid
8*a* electrode group fixing tape
8*b* insulating protective film fixing tape
9 liquid injection hole
10 gas discharge valve
11 liquid injection plug
12 negative electrode output portion
14 positive electrode output portion
22 negative electrode connection portion
24 negative electrode current collector plate (second current collector plate)
26 negative electrode-side through hole (second through hole)
32 negative electrode
32*b* negative electrode mixture layer
32*c* negative electrode foil exposed portion
33 separator
34 positive electrode
34*b* positive electrode mixture layer
34*c* positive electrode foil exposed portion
35 separator
42 positive electrode connection portion
44 positive electrode current collector plate (first current collector plate)
46 positive electrode-side through hole (first through hole)
80 cladding conversion portion
100 prismatic secondary battery
200 lid assembly

The invention claimed is:

1. A prismatic secondary battery comprising:
a battery container containing an electric storage element and having a first wide surface, a second wide surface, a pair of narrow surfaces, a bottom surface, and an opening;
a lid having a first through hole, a second through hole, and a centerline extending along a length of the lid, and configured to close the opening of the battery container;
a flat plate-like first current collector plate inserted into the first through hole and extending in a straight line toward the bottom surface; and
a flat plate-like second current collector plate inserted into the second through hole and extending in a straight line toward the bottom surface,
wherein the first current collector plate and the second current collector plate are made of metal materials, and a main material of the first current collector plate is different from a main material of the second current collector plate,
wherein a first position of a portion of the first current collector plate, disposed within the first through hole, is spaced at a first distance from the centerline of the lid, the first distance extending in a direction parallel to a top surface of the lid from the centerline of the lid toward the first wide surface,
wherein a second position of a portion of the second current collector plate, disposed within the second through hole, is spaced at a second distance from the centerline of the lid, the second distance extending in a direction parallel to the top surface of the lid, and
wherein a centerline of the first through hole and a centerline of the second through hole deviate from the centerline of the lid toward the first wide surface.

2. The prismatic secondary battery according to claim 1, wherein the first current collector plate is a positive electrode current collector plate containing aluminum as the main material, and the second current collector plate is a negative electrode current collector plate containing copper as the main material.

3. The prismatic secondary battery according to claim 1, wherein
a first resin member is arranged and sealed between the first current collector plate and the first through hole, and
a second resin member is arranged and sealed between the second current collector plate and the second through hole.

4. The prismatic secondary battery according to claim 3, wherein
a first gap of 0.3 mm or more is provided between the first current collector plate and the first through hole, and
a second gap of 0.3 mm or more is provided between the second current collector plate and the second through hole.

5. The prismatic secondary battery according to claim 3, wherein a roughening treatment is applied to a first adhesion portion of the first current collector plate and a second adhesion portion of the second current collector plate,
wherein the first adhesion portion is configured to contact the first resin member and the second adhesion portion is configured to contact the second resin member.

6. The prismatic secondary battery according to claim 3, wherein the first current collector plate and the second current collector plate are fixed to the lid with the respective resin members.

7. The prismatic secondary battery according to claim 3, wherein either one of the first current collector plate and the second current collector plate has a cladding conversion portion with a dissimilar metal, and the cladding conversion portion is arranged in the resin member.

8. The prismatic secondary battery according to claim 1, wherein the first current collector plate has a first thickness and the second current collector plate has a second thickness, wherein the first thickness is different from the second thickness.

9. The prismatic secondary battery according to claim 1, wherein the second distance corresponding to the portion of the second position extends from the centerline of the lid toward the first wide surface.

10. A prismatic secondary battery comprising:
a battery container containing an electric storage element and having a first wide surface, a second wide surface, a pair of narrow surfaces, a bottom surface, and an opening;
a lid having a first through hole, a second through hole, and a centerline extending along a length of the lid, and configured to close the opening of the battery container;
a flat plate-like first current collector plate inserted into the first through hole and extending in a straight line toward the bottom surface; and
a flat plate-like second current collector plate inserted into the second through hole and extending in a straight line toward the bottom surface,
wherein the first current collector plate and the second current collector plate are made of metal materials, and a main material of the first current collector plate is different from a main material of the second current collector plate,
wherein a first position of a portion of the first current collector plate, disposed within the first through hole, is spaced at a first distance from and perpendicular to the centerline of the lid, the first distance extending in a direction parallel to a top surface of the lid from the centerline of the lid toward the first wide surface,
wherein a second position of a portion of the second current collector plate, disposed within the second through hole, is spaced at a second distance from and perpendicular to the centerline of the lid, the second distance extending in a direction parallel to the top surface of the lid toward the second wide surface,
wherein a centerline of the first through hole deviates from the centerline of the lid toward the first wide surface, and a centerline of the second through hole deviates from the centerline of the lid toward the second wide surface, and
wherein the first distance from the centerline of the lid is greater than the second distance from the centerline of the lid.

11. The prismatic secondary battery according to claim 10, wherein the first current collector plate is a positive electrode current collector plate containing aluminum as the main material, and the second current collector plate is a negative electrode current collector plate containing copper as the main material.

12. The prismatic secondary battery according to claim 10, wherein
a first resin member is arranged and sealed between the first current collector plate and the first through hole, and
a second resin member is arranged and sealed between the second current collector plate and the second through hole.

13. The prismatic secondary battery according to claim 12, wherein
a first gap of 0.3 mm or more is provided between the first current collector plate and the first through hole, and
a second gap of 0.3 mm or more is provided between the second current collector plate and the second through hole.

14. The prismatic secondary battery according to claim 12,
wherein a roughening treatment is applied to a first adhesion portion of the first current collector plate and a second adhesion portion of the second current collector plate,
wherein the first adhesion portion is configured to contact the first resin member and the second adhesion portion is configured to contact the second resin member.

15. The prismatic secondary battery according to claim 12, wherein the first current collector plate and the second current collector plate are fixed to the lid with the respective resin members.

16. The prismatic secondary battery according to claim 12, wherein either one of the first current collector plate and the second current collector plate has a cladding conversion portion with a dissimilar metal, and the cladding conversion portion is arranged in the resin member.

17. The prismatic secondary battery according to claim 10, wherein the first current collector plate has a first thickness and the second current collector plate has a second thickness, wherein the first thickness is different from the second thickness.

* * * * *